June 10, 1941. C. W. BRENN Re. 21,822
MANIFOLDING
Original Filed Jan. 28, 1929 2 Sheets-Sheet 1
Fig. 1.
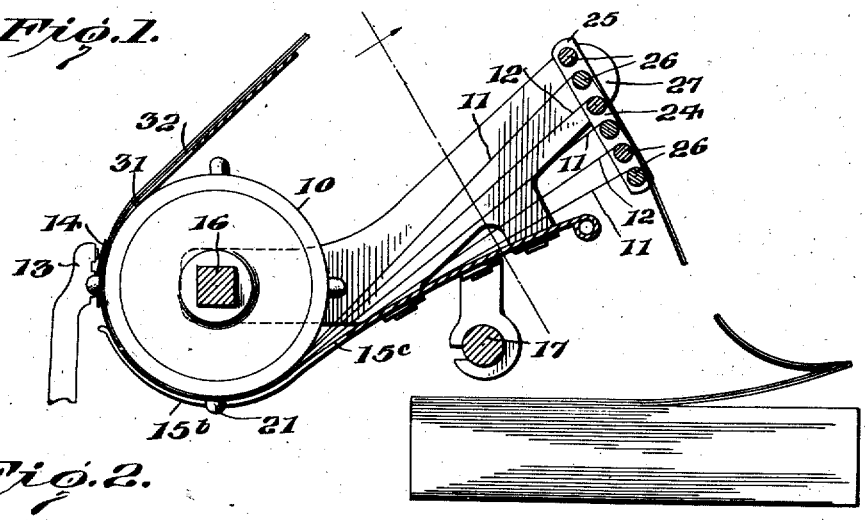
Fig. 2.
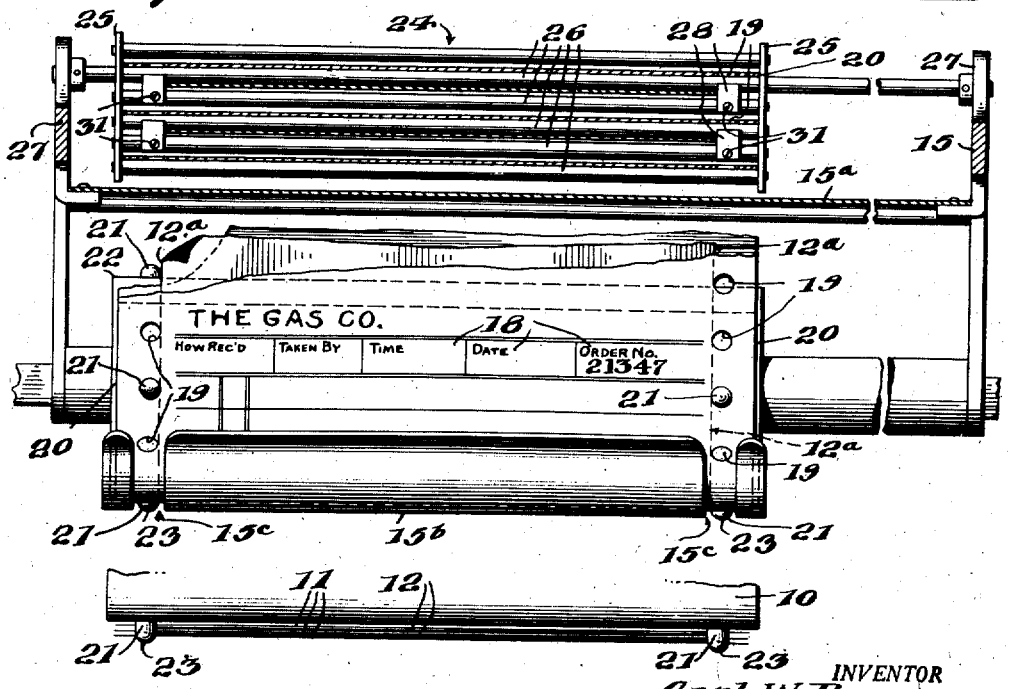
Fig. 3.
INVENTOR
Carl W. Brenn,
BY
ATTORNEY June 10, 1941. C. W. BRENN Re. 21,822

MANIFOLDING

Original Filed Jan. 28, 1929 2 Sheets-Sheet 2

INVENTOR
Carl W. Brenn,
BY
ATTORNEY

Reissued June 10, 1941

Re. 21,822

UNITED STATES PATENT OFFICE 21,822

MANIFOLDING

Carl W. Brenn, Montclair, N. J., assignor to Autographic Register Company, Hoboken, N. J., a corporation of New Jersey Original No. 2,067,376, dated January 12, 1937, Serial No. 401,897, October 23, 1929, which is a division of Serial No. 335,402, January 28, 1929. Application for reissue March 6, 1940, Serial No. 322,631

21 Claims. (Cl. 282—12)

This invention relates to manifolding, and is a division of my copending application Serial No. 335,402, filed January 28, 1929, which matured into Patent Number 1,957,405, May 1, 1934, and forms part of the invention described and claimed therein. The present application concerns the manifolding pile or pack per se.

In the art of manifolding, it is frequently desired to simultaneously feed work sheets and carbon sheets which are of indefinite length, so that the writing process might be continuous. In such work, to keep the several superposed strips in register longitudinally and transversely, it has been proposed to provide the strips with marginal rows of holes and to provide on the writing machine wheels having pins for engaging in these marginal holes to feed the sheets. To provide these marginal rows of holes in the carbon strips requires that they be passed through a printing press or similar machine equipped with punching devices. This processing of the carbon strips increases their cost and hence the cost of the supplies needed for performing the work. Yet, it is necessary to keep the carbon strips in substantial register with the work sheet strips, for otherwise they may gradually work outwardly of the pile in the feeding operations, or be actually jogged outwardly during the return movement of the carriage when used in a typewriter.

A feature of a portion of this invention claimed herein is the provision of a manifolding pile having the work sheet strips provided with margins extending beyond the side edges of the carbon sheet strips so that the carbon sheet strips need not be engaged by the pin-wheel feeding device and so that the margins may constitute feeding bands between which no carbon or transfer material is interposed, permitting feeding or other pressure to be applied to said side margins of the work sheets without smudging of the undercopies as a result of such pressure.

Another feature is the provision of the relatively narrow carbon strips of such width that their side edges are tangential to the pin-wheel feeding apertures in the work sheet strips whereby the pins engaging through said apertures may act as gages for the carbon strips and bring the carbon strips into desired lateral position with relation to the work sheet strips should they tend to slip sidewise.

Other features and advantages will hereinafter appear.

In the accompanying drawings, which show one form of the invention, that at present preferred—

Figure 1 is a sectional side view of part of a carriage of a typewriting machine, showing the device of the present invention applied thereto, and also showing a pack of stationery for use with the machine.

Fig. 2 is a front view of the carriage of a typewriting machine with the strips torn away to show more clearly the manner in which the guide at the introductory side of the platen functions.

Fig. 3 is a schematic view showing the manner in which the pins engage the side margins of the carbon sheet strips to hold the latter against lateral movement relatively to the platen and to the work sheet strips with which they are interleaved.

Figure 4:
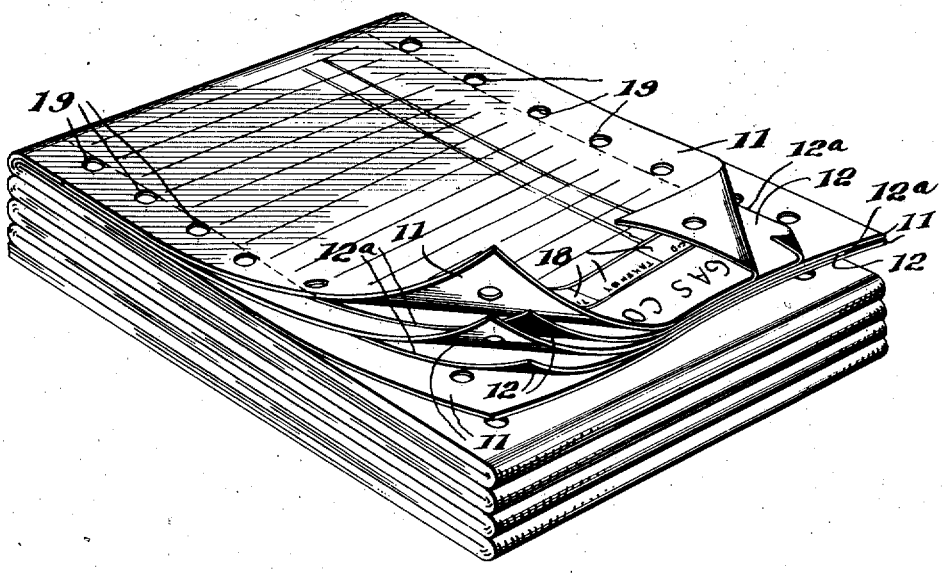
Fig. 4 is a perspective view of a pile of work sheet strips made in accordance with the present invention, showing the latter arranged in a zigzag folded pack.

The manifolding pile of the present invention may be used with various machines and, to exemplify the invention, is illustrated herein in the same connection in which it is illustrated in my said copending application, Serial No. 335,402, filed January 28, 1929, of which this is a division, wherein there is shown a typewriting machine having a platen 10 for supporting work sheet strips 11 and carbon sheet strips 12 in position to be engaged by type bars 13 which, as indicated, swing upwardly and rearwardly against the front face of the platen to imprint characters on the uppermost work sheet strip 11 by means of a ribbon 14 and to cause those characters to be duplicated on the under strips 11 by the carbon sheet strips 12, one of which is provided for each of the under work sheet strips 11. The platen 10 is mounted in a carriage 15 adapted to travel to and fro in letter-space direction. In the form shown, the carriage slides on a square shaft 16 passing through the center of the platen 10 and serving to rotate the platen when it is rotated and has a rear guide 17 upon which it rides.

The carriage 15 has a paper table 15a at the introductory side of the platen for guiding work sheets thereto and the forward part of the table has an apron 15b which holds the work to the platen.

The work sheet strips 11 usually contain a succession of printed forms having delineated spaces 18 in which indicia is to be written. Due to the proximity and restricted area of the spaces 18, it is imperative that all the work sheet strips 11 be maintained in accurate registration, so that indicia written in the delineated space of one strip will be located entirely within the corresponding delineated space of the other strips.

To maintain this desired registration, it has previously been proposed that, as shown in the accompanying drawings, the work sheet strips 11 be provided with holes 19, arranged in succession forming rows extending longitudinally of the strips and at the side margin 20 thereof. The holes 19 are adapted to be engaged by pins 21 carried by wheels 22 secured to the platen 10 so as to rotate therewith. In the feeding operation, the pins 21 being engaged with some of the holes 19 advance the strips coincidently with the rotation of the platen, and as the pins one after another engage succeeding holes at the introductory side of the platen, due to their tapered ends 23, they bring the strips into accurate registration and positively advance all of the strips together without any danger of slippage between them. The paper apron 15b holds the work sheets close to the platen and the pin-wheel so that the pins will extend through the holes 19. The paper apron 15b is slotted at 15c to permit rotation of the pin-wheels without interference of the apron with the pins.

Were the carbon sheet strips 12 similarly provided with holes, they too would be held in the desired relation to the work sheet strips 11. But, to thus prepare the carbon sheet strips it would be required that they be passed through a machine which would punch the holes in the side margins and this would add cost to the pack or roll of stationery.

To avoid this, the present invention provides means for guiding and controlling the positions of the carbon sheet strips so that they are maintained in the desired location between the work sheet strips without requiring that they be provided with these rows of marginal holes.

This is accomplished by the present invention by accurately and positively guiding the carbon sheet strips by their side edges both at the platen and at a point at the introductory side of and close to the platen.

The means for accomplishing the last-named function in the form shown herein, comprises a frame 24 having side plates 25 between which are secured guide rods 26 over which both the work sheet strips 11 and the carbon sheet strips 12 ride, one strip engaging each rod. The frame 24 is pivotally mounted in arms 27 forming part of the carriage 15, and this is done by extending one of the rods 26 from the side plates 25 to the arms 27 of the carriage. This mounting of the frame permits the latter to swing and assume the most natural position for guiding the strips. In loading the machine, the strips 11 and 12 are led from a pack P supported on a table or other convenient device and the strips are separated with one strip only passing over each rod 26.

In the form shown, the work sheet strips 11 are guided by directly engaging with their side edges 20 on inside surfaces of the plates 25, and thus are kept in accurate alignment with each other. The carbon sheet strips 12, however, which, for reasons stated below, are narrower than the work sheet strips, engage with their side edges 12a against guiding blocks 28 placed between the rods 26 which lie above and below the carbon strip 12. The guides 28 are each provided with a hole 29 to receive the lowermost of the pair of rods and a semi-circular notch 30 to receive the upper rod. The guide 28 is held in adjusted position by a set screw 31 carried by the guide and engaging the lowermost rod.

As stated, and as is customary, the work sheets are guided and held in accurate alignment at the platen by the engagement of the pins 21 on the pin-wheels 22 with the marginal holes 19 in the work sheet strips. To guide the carbon sheets and prevent them from shifting transversely at the platen, the present invention makes the carbon sheet strips 12 of such width or places the pins 21 in such position (according to which change is most convenient or desirable) that the side edges 12a of the carbon sheet strips 12 are in position to be engaged by the inside edges 21a of the pins 21, as shown in Fig. 3. The pins 21 thus hold the carbon sheets 12 captive between the work sheets at the platen and should a carbon sheet tend to skew or to creep sidewise during the rotation of the platen, the pins 21 will cam or guide them back into position.

Of course, it is not absolutely essential that the distances between the side edges 12a of the carbon strip and between the inner edges 21a of the pins be absolutely the same, but when used with the mechanism described it is preferable that they be substantially the same, leaving only such clearance between the edges 12a of the carbon strip and the edges 21a of the pins as is necessary or expedient to compensate for variations in the manufacture of the parts and paper. The space, however, between the side edge 12a of the carbon strip and the inner edge 21a of the pin must not be so great as to permit substantial movement of the carbon sheet, for otherwise should the sheets skew for some reason between the guides 28 and the point where the pins 21 engage the work sheet strips, the carbon strip might overlie the apertures 19 in the work sheet strips and be pierced by the pins. The danger of this occurring is mitigated to a great extent by the provision of the guide blocks 28 for the carbon sheets at the introductory side of the platen and taken together with the side edges of the pins 21 have been found in practice to keep the carbon sheet strip well confined and against lateral movement relatively to the work sheet strips.

After the strips 11 have been fed around the platen by the pin-wheels 22, they are stripped from the pins by a plate 31 at the delivery side of the platen. The plate 31 has slots 32 through which the pins pass to lift the paper from the pins as the platen is rotated, the paper being forced to travel upwardly along the plate.

The carbon and work sheet strip controlling means of the present invention is extremely advantageous, particularly in connection with automatic or telegraph typewriters which frequently operate for relatively long periods without being observed by an operator.

The frame 24, instead of being arranged so that the side edges 20 of the work sheet strips engage the plates 25, as shown in Fig. 6, has other blocks 28a for guiding the work sheet strips and these may be adjustable as in the case of the blocks 28.

From the above, it will be seen that the proper relationship between the pins 21 and the side edges 12a of the carbon sheet strips may be obtained by either changing the positions of the pins or making the carbon sheet strips wider, that is, changing the machine or the pack of stationery. Accordingly, the present invention contemplates and embraces not only the mechanism disclosed and claimed in my copending application aforesaid, but also a manifolding pile claimed per se herein.

Variations and modifications may be made within the scope of this invention and portions of the improvements may be used without others.

Having thus described the invention, what is claimed as new and for which it is desired to obtain Letters Patent, is:

1. A manifolding pile comprising a plurality of superposed continuous work sheet strips; and a continuous carbon sheet strip of the same length interposed between each two adjacent work sheet strips, the work sheet strips having at each side margin a row of circular holes, and the carbon sheet strips being of such width that each side edge thereof is tangent to the holes of the adjacent row of holes in the work sheet strips.

2. A manifolding pack comprising a plurality of superposed continuous work sheet strips; a strip of transfer material interposed between each two of the work sheet strips running with and of the same length as the latter, said work sheet strips and carbon strips being superposed in registration to form a pile and being folded in zig-zag fashion while in such superposed registered condition to form a pack; and means on the work sheet strips extending beyond the side edges of the other strips and providing marginal zones by means of which the pile of strips may be held in predetermined position on the platen.

3. A manifolding pile comprising a plurality of physically separate single ply work sheet strips and a carbon strip between each two work sheet strips running with the work sheet strips in interleaved relation, a plurality of the strips of one kind having margins extending beyond the side edges of the other kind of strips and having pin-wheel engaging apertures located in said margins.

4. A manifolding pile comprising a plurality of physically separate work sheet strips and a plurality of continuous carbon strips running with the work sheet strips in interleaved relation and free of bodily attachment to the adjoining strips, all of said plurality of work sheet strips having margins extending beyond the side edges of the interleaved carbon strips and constituting feeding bands which are free of the underlying carbon strips and by means of which the pile may be fed.

5. A manifolding pile comprising a plurality of superposed continuous work sheet strips; and a continuous carbon sheet strip between each two work sheet strips running with the work sheet strips in interleaved relation, the work sheet strips having margins extending beyond the side edges of the carbon sheet strips and having pin-wheel engaging apertures located in said side margins.

6. A manifolding pile comprising a plurality of superposed continuous work sheet strips; and a continuous carbon sheet strip between each two work sheet strips running with the work sheet strips in interleaved relation, the work sheet strips having margins extending beyond the side edges of the carbon sheet strips and constituting feeding bands free of the underlying carbon sheet strip by means of which the pile may be fed.

7. A stationery article comprising a plurality of continuous superimposed single ply paper strips having a plurality of spaced lines of perforations so as to be jointly divided into multiplicate sets, a plurality of said strips projecting beyond at least one other of said strips on at least one lateral edge to form a feeding edge for cooperating with the shifting element of an inscribing machine.

8. A stationery article comprising a plurality of continuous superimposed single ply paper strips having a plurality of spaced lines of perforations so as to be jointly divided into multiplicate sets, a plurality of said strips projecting beyond at least one other of said strips on at least one lateral edge and having the projecting portion of the bodies thereof formed with a series of feed apertures.

9. A packet of manifolding material including two continuous independent relatively superposed record strips and a continuous strip of transfer material interposed between the record strips, said strips being collectively interfolded into continuous zigzag formation whereby the succeeding folds will tend to hold said strips against relative shifting movement, the longitudinal margins of the transfer strip and record strip being laterally offset to enable operative engagement of strip feeding devices with the record strips independently of the interposed transfer strip.

10. An assembly of manifolding material comprising a plurality of superposed continuous independent record strips and interleaved transfer strips, said strips being collectively interfolded into zigzag formation to form a supply packet from which the strips are simultaneously withdrawn, the record strips being of greater width than the transfer strips and apertured in that portion extending beyond the transfer strips to enable engagement with strip feeding and arresting devices independently of the interleaved transfer strips.

11. A manifolding pile comprising a plurality of superposed work sheet strips and a continuous carbon strip interleaved between each two adjacent work sheet strips, the several strips being free of such attachment to each other as would cause them to mutually advance each other longitudinally but having feeding contact with each other when wrapped partially around a cylindrical platen of a typewriting machine, a plurality of the strips in the pile having lateral marginal feeding bands projecting beyond the edges of a plurality of the other strips whereby some of the strips of the pile are fed directly through the medium of the feeding means engaging said feeding band and others indirectly through the strips so fed directly.

12. In a manifolding assembly, alternating sheets of record and transfer material adapted for simultaneous engagement with sheet feeding mechanism, there being clearance provided at the point of engagement whereby the transfer material is free for limited shifting movement relative to the feeding mechanism to greater extent than the record material.

13. An assembly of overlapping strips of manifolding material including a plurality of continuous lengths of record material and corresponding continuous lengths of transfer material, portions of material throughout overlapping areas of different extent being removed from the respective lengths of record and transfer material at the side margins to enable engagement of one of the materials with the material feeding means without interference by the other material, said record material and transfer material being superposed in manifold relationship with each other and having transversely scored lines at established intervals for easy division.

14. Continuous manifolding material, including a plurality of superposed alternating portions of record material and transfer material, portions of material throughout overlapping areas of different extent being removed from all of the respective record and transfer materials to enable engagement with material feeding means.

15. In a manifolding assembly a plurality of superposed sheets of material adapted for simultaneous engagement with sheet feeding mechanism, there being a clearance provided at the point of engagement whereby at least one of the sheets is free for limited shifting movement relative to the feeding mechanism to a greater extent than another sheet of the assembly.

16. Means for maintaining work sheet strips and structurally separate carbon sheet strips in desired registration while passing over a platen in a writing machine comprising pin wheels at the platen having pins engaging marginal rows of holes in the work sheet strips to thereby hold the latter in registration, said pins being so located relative to the edges of the carbon sheet strips that the inner edges of the pins are located in close proximity to the side edges of the carbon strips so as to prevent appreciable lateral movement of the carbon sheet strips relative to the platen and to the work sheet strips.

17. In a writing machine having a platen for supporting continuous work sheet strips and separate continuous carbon sheet strips; feeding means for the strips comprising pin wheels having pins engaging marginal rows of holes in the work sheet strips to thereby hold the latter in registration and in predetermined position on the platen, said carbon sheet strips having their side edges fitting snugly between the pins of the pin wheels to be guided by the pins against lateral movement.

18. In a writing machine having a platen over which a pile of continuous strips is fed; and strip-feeding means comprising pin wheels, some of said strips of the pile having margins projecting beyond the margins of other strips and having in said margins rows of holes adapted to be engaged by the pins of the pin-wheels to be fed thereby, the narrower strips having their side edges fitting snugly between the pins of the pin wheels to be held thereby against lateral shifting movements relative to the other strips.

19. In a writing machine having a cylindrical platen about which is wrapped a pile of continuous strips to be supported thereby in writing position, certain of said strips having margins projecting beyond other strips and having in said margins rows of holes; and pin wheels on the platen having pins for engaging said holes in said wider strips and hold the same in registration on the platen, the narrower strips being interspersed between the wider strips and being fed by the wider strips by the binding action produced between all of the strips of the pile as the result of the wrapping of said pile around the platen.

20. A continuous manifolding material including a plurality of independent strips of record material alternating with a plurality of strips of the transfer material, portions of different extent of the material throughout overlapping areas, being removed from all of the respective record and transfer materials to enable engagement with material feeding means.

21. A manifolding pile comprising superposed physically separate original and duplicate record strips and a transfer strip interposed between said record strips and being free of bodily attachment to either of said record strips, said record strips on at least one lateral edge each projecting beyond the transfer strip to form a feeding band, said feeding band being apertured for cooperating with pins of the feeding mechanism of an inscribing machine.

CARL W. BRENN.